INVENTORS
CHARLES A. BORCHER
WILLIAM FRANTZ
BY Julian C. Renfro
ATTORNEY

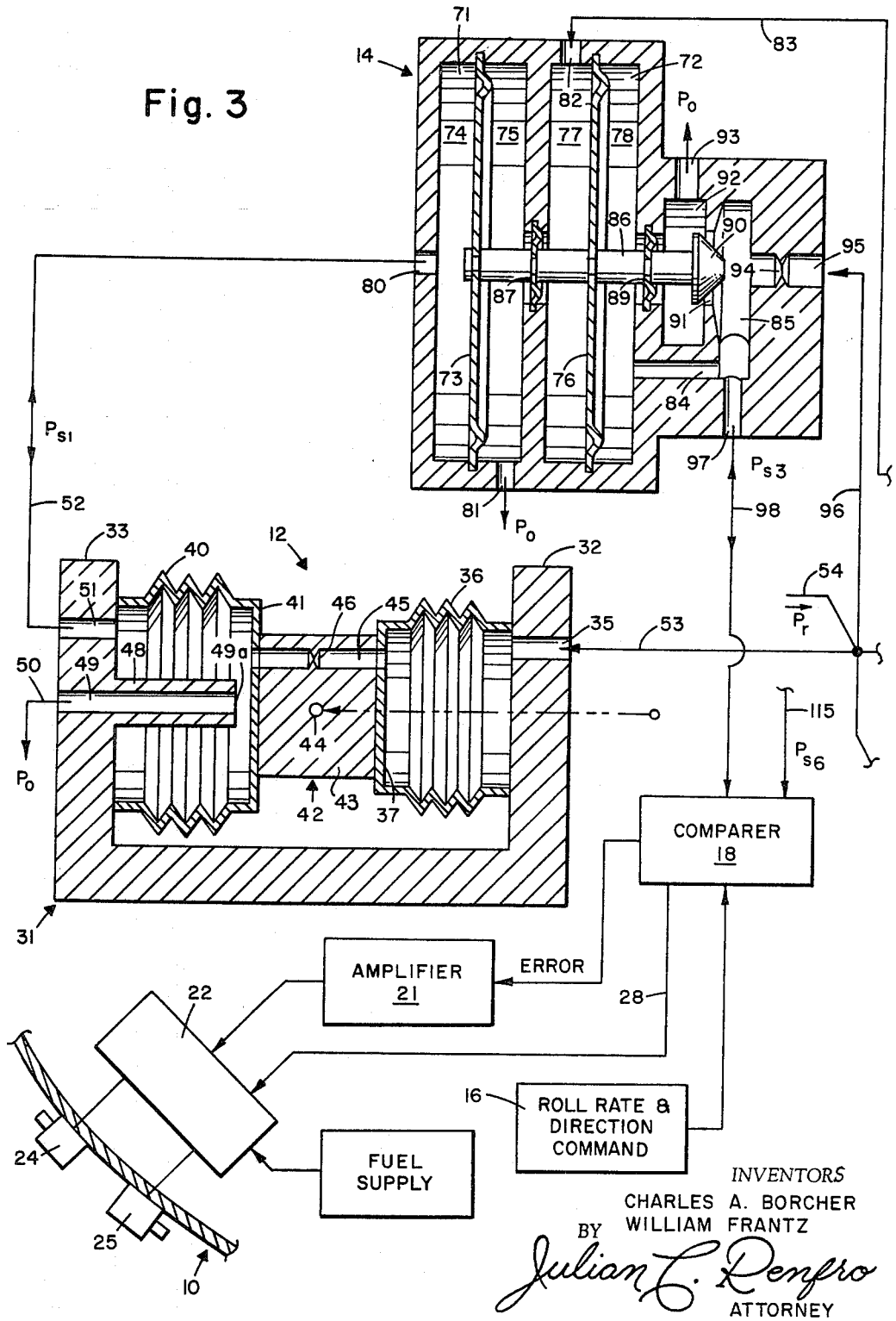

United States Patent Office 3,278,139
Patented Oct. 11, 1966

3,278,139
ROLL CONTROL SYSTEM AND FLUID
TACHOMETER THEREFOR
Charles A. Borcher, Orange County, Fla., and William Frantz, Los Angeles County, Calif., assignors to Martin-Marietta Corporation, Middle River, Md., a corporation of Maryland
Filed Nov. 29, 1963, Ser. No. 326,934
13 Claims. (Cl. 244—14)

This invention relates generally to systems for sensing, indicating, and/or correcting the speed of rotation of a missile, satellite, or the like, about a rotational axis and with respect to an inertia frame of reference. More particularly, the invention is directed to such systems in which the rotational speed sensing or tachometer means is fluid pressure operated.

Prior art roll rate sensors or tachometers have been proposed heretofore which comprise a mass offset from the axis of rotation and supported for radial movement with respect to the axis of rotation so that when the support means and mass are rotated in a circular path about the axis of rotation, a centrifugal force is developed which tends to displace the mass radially outwardly from a normal resting position with respect to the support means. The centrifugal force, tending to displace the mass as a result of inwardly directed accelerating forces causing it to follow a circular rather than a straight path may be represented by the formula $F=mR\omega^2$, where $m$ is equal to the mass in gravitational units, R is the effective distance of the mass from the center of rotation, and $\omega$ is the angular velocity or roll rate expressed in radians. Such devices have included electrical or mechanical means for generating a restoring or balancing force in response to the displacement of the mass thereby, the restoring force being taken as a measure of the angular velocity. The electrical systems have utilized electromagnetic displacement detecting and force producing means which may be subject to false signals generated by random disturbances or self induced signals, and have required high gain amplifier means associated with the electrical system. The pneumatic systems have been limited to the production of a fluid pressure signal which is indicative only of the rate of rotation, and have been ambiguous as to the direction thereof. Further, the prior art devices have been subject to decreased sensitivity as the roll or rotation approaches a predetermined desired rate or as it approaches a zero rotational condition. Other shortcomings of the prior known tachometers and roll rate controlling systems reside in the inability thereof to indicate direction of rotation, and sensitivity to axial and radial accelerations or displacements of the system as a whole, which has limited their use to applications wherein the axis of rotation is stationary or static.

It is a principal object of this invention to provide improved fluid operated tachometer or roll rate sensing means which provides a fluid pressure signal which is directly related to the angular velocity or roll rate of the system, for example when installed in a missile, and which fluid pressure signal may be utilized to operate indicating means which will read out the angular velocity directly, or to operate, through suitable signal comparing and amplifying means, control means for correcting a roll rate error.

Another object of this invention is the provision of fluid pressure operated tachometer means which is insensitive to accelerations or displacements of the system as a whole with respect to a fixed inertia frame of reference, whereby the roll rate of a missile, satellite, or the like about a given rotational axis may be accurately reflected in a fluid pressure signal regardless of other accelerations or changes in the attitude of the missile or satellite with respect to the frame of reference.

A further object of this invention is the provision of such a fluid pressure operated tachometer or roll rate sensor comprising in combination first and second acceleration responsive means offset from the rotational axis in opposite directions and responsive to acceleration forces acting radially thereon to produce first and second fluid pressure signals respectively, and means for combining the fluid pressure signal of the first and second acceleration responsive means so as to cancel out the equal but opposite effects of random, axial, or translational accelerating forces which act in the same direction on the acceleration responsive means and produce equal but opposite pressure signal errors, the combined pressure signals thereby providing a third fluid pressure signal corresponding directly to the rotational velocity of the acceleration responsive means about the axis.

As another object this invention aims to provide a fluid pressure operated tachometer which produces a finite fluid pressure signal for zero rotational velocity as well as for actual rotation, and which exhibits substantially uniform sensitivity throughout its range of operation, whereby roll control systems embodying the tachometer are not subject to a degraded response and control effectiveness as the missile or other controlled object approaches a zero or other predetermined roll rate.

Yet another object of this invention is the provision of an improved roll rate control system including fluid pressure operated tachometer or roll rate sensing means of the foregoing character in combination with command signal comparing means for producing an error signal which is utilized in effecting operation of roll rate correcting means such as a movable control surface or tangentially directed jets, and roll correction direction sensing means providing fluid pressure signals which are utilized to effect reversal of correction in the event the error is increased rather than decreased. Preferably the direction sensing means comprises first and second bidirectional acceleration responsive devices offset in opposite directions from the axis and having masses supported for response to forces normal to radii therethrough and to the axis, the acceleration responsive devices providing like pressure signal changes in response to rotational accelerations and equal but opposite pressure signal changes in response to acceleration forces of translation, yaw, pitch and the like, whereby the direction pressure signals may be added to cancel pressure signal indications other than for pure rotation corrections.

In accordance with our invention the first and second acceleration responsive means of the tachometer or roll rate sensor each comprise an inertial member or mass mounted for displacement in opposite directions along a radius in response to acceleration forces (such as centrifugal force), and pressure fluid conducting means for connection to a source of pressure fluid and including a fixed orifice and a variable orifice connected in series so that fluid flow through the orifices will establish therebetween a resulting signal pressure related to the ratio of areas of the orifices. A biasing means, such as a spring, or such as a bellows or diaphragm under regulated pressure, urges the inertial member in one direction along its respective axis with a relatively constant force, while a bellows or other pressure to force means is responsive to the signal pressure and acts against the inertial member in the opposite direction.

The variable orifice is controlled by movements of the inertial member so that a signal pressure is developed which just balances the net effect of the biasing means and centrifugal or other radial forces on the inertial member. By adjusting the biasing means and selecting values of $m$ and R, the acceleration responsive means will each provide a predetermined finite pressure signal corresponding to a desired rotational velocity (including zero velocity), and will vary the signal pressures in accordance with changes in the rate of rotation.

Because the acceleration responsive means are oriented in opposite directions with respect to one another, changes in rotation velocity will be reflected in identical changes in each pressure signal while other acceleration forces acting on the system from yaw, pitch or translational movements will produce equal but opposite changes in the signal pressures, which changes are cancelled out by adding the pressure signals to produce a third signal pressure related only to rotational velocity.

Other objects and advantages of the fluid tachometer and roll control system of this invention will become apparent from the following detailed description of preferred embodiments thereof read in conjunction with the accompanying sheets of drawings forming a part of this specification, and in which FIG. 1 is a perspective view of a missile embodying the fluid tachometer and roll control system of this invention;

FIG. 3 is a fragmentary illustration of a portion of the control system of FIG. 2 showing certain elements thereof on an enlarged scale and in vertical section.

Figure 1:
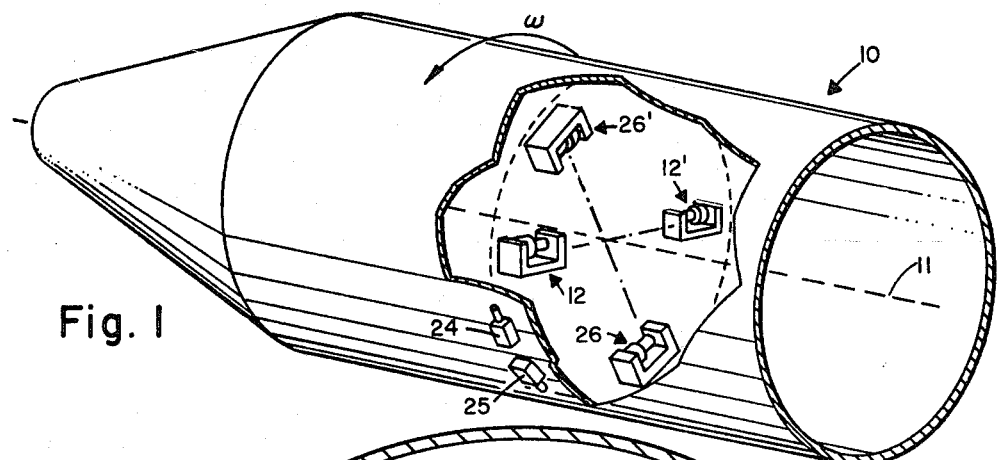

An exemplary embodiment of the invention will now be described with reference to use in controlling the roll rate or angular velocity of a missile 10 about its axis of rotation 11 while in flight. It will be understood, however, that while reference to a missile 10 of generally conventional configuration is given by way of example, the invention is applicable to other, less conventional missiles, vehicles, or the like, having controllable rotation about a predetermined axis of rotation.

The fluid tachometer apparatus of this invention comprises first and second angular velocity sensing means in the form of acceleration responsive devices 12 and 12' which are radially offset from the rotational axis 11 in opposite directions therefrom. The acceleration responsive devices 12 and 12' are adapted to provide fluid pressure signals $P_{s1}$ and $P_{s2}$ which are combined by a fluid pressure adder 14 to provide a fluid pressure signal $P_{s3}$ corresponding to the roll rate or angular velocity of the missile 10 about its axis 11. As will be more fully explained hereinafter, the combining of signal pressures $P_{s1}$ and $P_{s2}$ provide a signal pressure $P_{s3}$ which is free of other acceleration effects resulting from yaw, pitch or the like. The roll rate signal $P_{s3}$ may be fed to an indicator 15 which reads out the roll rate directly, for example in revolutions per minute. Also, the pressure signal $P_{s3}$ may be utilized in maintaining a predetermined roll rate in accordance with roll rate and direction commands, for example from a ground station or from roll rate and direction command programming means 16.

In the latter case the roll rate signal $P_{s3}$ and a roll rate command signal are compared by a comparer 18 to produce a roll rate error signal which is transmitted by a suitable transmission line 20 and amplifier 21 to actuator means 22 for roll rate control means which, in this example, comprise tangentially and oppositely directed jets 24 and 25 which may be alternatively operated to accelerate or decelerate the missile roll in a manner well understood by those skilled in the art to which the invention pertains.

In addition the system includes means for sensing the direction of roll rate correction, this means being in the form of acceleration responsive means 26, 26' which are offset from the rotational axis 11 and oriented to be responsive to acceleration forces tangential to a circle extending therethrough and concentric with the axis 11. The direction sensing devices 26, 26' are adapted to provide fluid pressure signals $P_{s4}$ and $P_{s5}$, each corresponding to the magnitude and direction of acceleration experienced thereby. The signals $P_{s4}$ and $P_{s5}$ are combined by an adder 27 to provide a signal $P_{s6}$ corresponding to magnitude and direction of roll rate correction. This signal is applied to the comparer 18 for comparison against the roll direction command provided by programmer 16. The direction comparison result is applied via a suitable transmission line 28 to the actuator 22 and effects reversal of the actuation of roll correction jets 24 and 25 in the event the corrections tend to increase the error rather than decrease the error.

The acceleration responsive devices 12, 12' and 26, 26' may be of similar construction, and accordingly only the acceleration responsive device 12 will be described in detail herein. Referring now to FIG. 3, the acceleration device 12 comprises support means in the form of a U-shaped frame 31 having spaced, parallel uprights 32 and 33. The upright 32 is provided with an inlet passage 35 communicating with the interior of a first pressure to force converting means in the form of an expansible bellows 36 mounted on the upright 32 and including a movable wall 37. A second pressure to force converting means is provided by a bellows 40 which is mounted on the upright 33 and includes a movable wall 41. The bellows 40, in this example, has an effective area which is twice that of the bellows 36 for a purpose which will become apparent as the description proceeds.

Disposed between the bellows 36 and 40 is a movable inertial mass 42 provided by a weight member 43 which is secured to the movable bellows wall 41 and 37. The mass 42 may be considered to be concentrated at a point 44 at a radial distance R from the rotational axis 11, and is confined by the bellows 36 and 40 to linear movement toward and away from the rotational axis along the radius R. The member 43 is provided with a passageway 45 leading from the interior of bellows 36 to the interior of bellows 40, and comprises a fixed orifice 46.

The upright 33 is provided with a tubular extension 48 extending into the bellows 40 and terminating adjacent the inner surface of the wall 41. An outlet or drain passage 49 is defined in the extension 48 and upright 33, the passage 49 having its outer end opening to a drain line 50 at a reference pressure $P_0$. The inner end of the passage 49 opens at 49a adjacent the movable wall 41 of the bellows 40, and it will be recognized that the effective area of the opening at the end 49a of the passage 49 will be governed by the position of the mass 42 and movable wall 41 with respect to the extension 48. The opening between the passage end 49a and wall 41 will therefore be referred to hereafter as the variable orifice 49a. The upright 33 is provided with a second passageway 51 which communicates with the interior of the bellows 40 and is connected by a line 52 to the adder 14.

The passageway 35 is connected by fluid pressure conduits 53 and 54 to a pressure fluid supply (not shown) which provides pressure fluid at a regulated supply pressure $P_r$ with respect to the drain or reference pressure $P_0$. The regulation of $P_r$ with respect to $P_0$ is achieved by any well known means which forms no part of the present invention and need not be described herein.

It will be seen that pressure fluid flow may be traced from the pressure supply line 54 through line 53 and passage 35 into the bellows 36. The bellows 36 converts the pressure $P_r$ to a constant biasing force urging the mass 42 radially outwardly from the axis of rotation 11. This relatively constant force $F_c$ will be equal to $P_r$ times the effective area $A_1$ of the bellows 36. For some instances it may be found more convenient to replace this constant force ($P_r \times A_1$) with a spring, even though a potentially less accurate system may result from so doing.

The fluid pressure $P_r$ flows from the interior of bellows 36 through passage 45 and restricted or fixed orifice 46 to the interior of the bellows 40, and thence through variable orifice 49a and passage 49 to the ambient atmosphere at reference pressure $P_0$. The just described flow path will be seen to comprise the fixed orifice 46 and the variable orifice 49a connected in series with the bellows 40 therebetween. Assuming the pressure differential between $P_r$ and $P_o$ to remain constant, there will be developed between the orifices and within the bellows 40 a resultant signal pressure $P_{s1}$ which will vary inversely with respect to changes in the variable orifice 49a. That is to say, if mass 42 and wall 41 are moved away from the tubular extension 48, so as to increase the effective area of the variable orifice 49a, there will be experienced a corresponding reduction in the pressure $P_{s1}$ in the bellows 40. Conversely, when the mass 42 is moved toward the variable orifice 49a so as to reduce the effective area thereof there will be experienced in the bellows 40 a corresponding increase in the pressure $P_{s1}$.

The pressure $P_{s1}$ in the pressure to force converting bellows 40 will cause the latter to exert a variable force $F_v$ urging the mass 42 toward the rotational axis 11, the force $F_v$ being represented by the equation $F_v = P_{s1}(2A_1)$. The bellows 36 and 40 act in opposition on the mass 42 and tend to move it to a position in which all of the forces acting thereon are in balance. When the missile 10 is in a no roll condition, and is not undergoing other accelerations, the mass 42 will seek a balance position in which $F_v = F_c$. Because in this particular embodiment the effective area of bellows 36 is twice that of bellows 40 it will be apparent that for the no roll condition the signal pressure $P_{s1}$ will be one-half the supply pressure $P_r$. It will also be apparent that because the signal pressure is developed in a live, flowing system and is dependent upon the ratio of orifices 46 and 49a, the signal pressure fluid may be utilized to do increments of useful work without appreciably affecting the accuracy of the system.

Assuming the missile 10 is now set into simple rotational or rolling movement about its axis 11 with an angular velocity the mass 42 will be subjected to an outwardly directed centrifugal force which may be calculated from the formula $F = mR\omega^2$. The mass 42 will move outwardly under the centrifugal force and will reduce the effective area of the variable orifice 49a causing the signal pressure $P_{s1}$ to increase until the force exerted by bellows 40 balances the combined effects of the centrifugal force on the mass and the constant biasing force of the bellows 36 under the supply pressure $P_r$. Thus, the signal pressure $P_{s1}$ will correspond to the angular velocity $\omega$ and can be utilized to actuate indicator means, such as indicator 15, calibrated for example in revolutions per minute, and the pressure $P_{s1}$ can be utilized to actuate means to maintain a predetermined desired roll rate. The actual movement of the mass 42 will be on the order of only several thousandths of an inch and will have negligible effect on the distance R.

In order to make the system independent of other accelerations having components directed along the radius passing through the mass 42, such as might occur from pitching, yaw, drift, or intended course changes of a missile embodying the system, the tachometer of this invention contemplates the inclusion of the second acceleration responsive means 12'. Acceleration responsive means 12', which is offset from the axis 11 in the opposite direction from the means 12, has the same constant factors of radial distance R and mass $m$, and is supplied with the constant supply pressure $P_r$ through a suitable line 54. The bellows 36' and 40' confine the mass 42' to radial movement with respect to the axis 11 in response to accelerating forces and is calibrated to provide the second fluid pressure signal $P_{s2}$ in accordance with the angular velocity $\omega$ of the missile 10.

Figure 2:
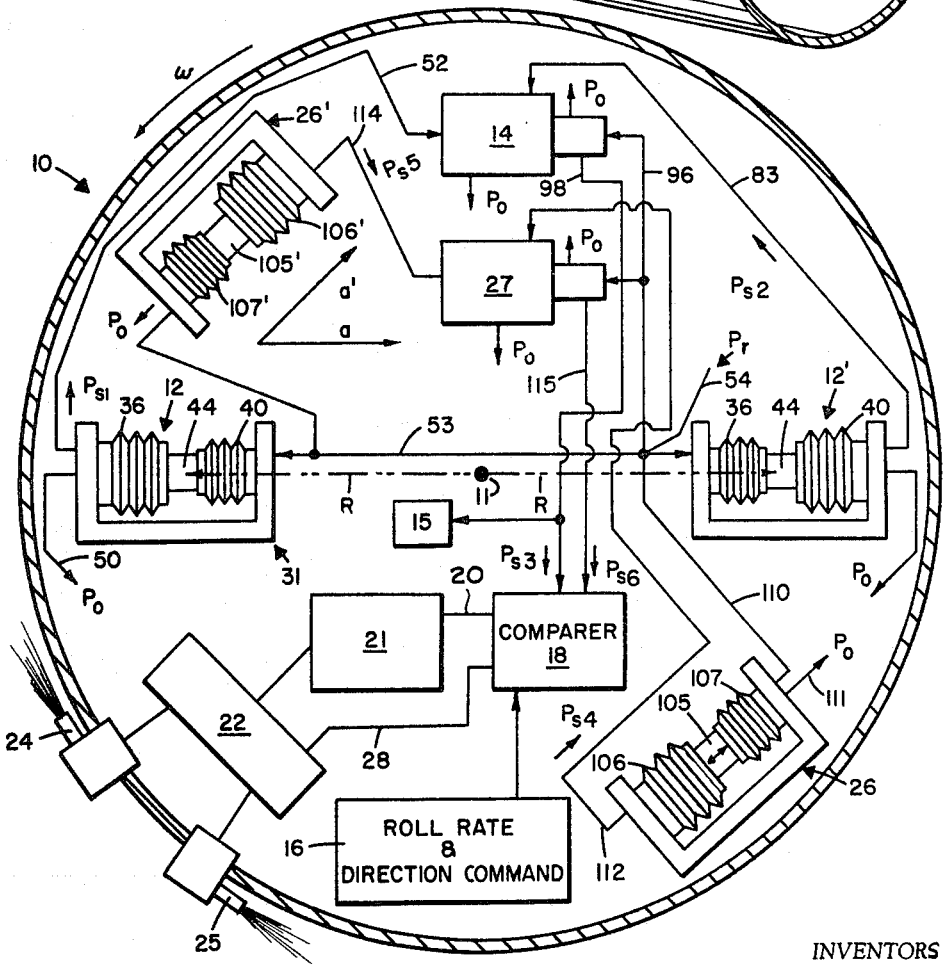
FIG. 2 is a schematic illustration of the arrangement of roll rate and direction sensing elements forming a part of the system.

If the missile 10 is now subjected to a random acceleration having a component ($a$) acting in the same direction on both of the masses 42 and 42', as shown in FIG. 2, the sensing means 12 and 12' will seek new equilibrium positions in which $P_{s1}$ will be reduced by an error amount equal to an increase in signal pressure $P_{s2}$. Since the error introduced by the acceleration ($a$) is added on one side and subtracted on the other side, the error may be cancelled by adding the signal pressures $P_{s1}$ and $P_{s2}$ to produce a third signal pressure $P_{s3}$ representing only the angular velocity $\omega$ of the missile 10 about its axis 11. The equilibrium condition of the acceleration responsive responsive means 12 as a result of the acceleration component ($a$) may be represented as follows:

$$P_r A_1 + mR\omega^2 - ma = (P_{s1})(2A_1)$$

[Equation I]

and for acceleration responsive means 12':

$$P_r A_1 + mR\omega^2 + ma = (P_{s2})(2A_1)$$

[Equation II]

Because $P_r$, $A_1$, R, and $m$ are all constants, Equation I becomes:

$$K_1 + K_2\omega^2 - ma = K_3 P_{s1}$$

and Equation II becomes:

$$K_1 + K_2\omega^2 + ma = K_3 P_{s2}$$

The sum of these equations gives:

$$2K_1 + 2K_2\omega^2 = 2K(P_{s1} + P_{s2})$$
$$\omega^2 = K(P_{s1} + P_{s2}) - K_1/K_2$$

[Equation III]

From Equation III it can be seen that the angular velocity is related directly to the sum of the signal pressures $P_{s1}$ and $P_{s2}$.

The adding of the signal pressures $P_{s1}$ and $P_{s2}$ is accomplished by the adder 14 to provide the error free pressure signal $P_{s3}$. Referring to FIG. 3, the adder 14 comprises a body 70 having recesses 71 and 72, with the recess 71 being divided by a diaphragm 73 into chambers 74 and 75. The recess 72 is divided by a diaphragm 76 into chambers 77 and 78. The chamber 74 is provided with an inlet passage 80 connected to line 52 carrying the signal pressure $P_{s1}$ which acts on the diaphragm 73 toward the right as viewed in the drawings. The chamber 75 is provided with a passage 81 connected by a suitable line to the reference or drain pressure $P_o$. The chamber 77 is provided with an inlet passage 82 connected to a line 83 for transmitting the reference pressure $P_{s2}$ from the second acceleration responsive means 12'. The chamber 78 is provided with a passage 84 communicating with a chamber 85 in which the resulting third signal pressure $P_{s2}$ is developed in a manner which will become apparent as the description proceeds.

The diaphragms 73 and 76 are interconnected by a rod 86 which extends through suitable flexible seals 87 and 89, and carries a valve member 90. The valve member 90 controls the effective area of a variable orifice 91 communicating between chamber 85 and a chamber 92 which is connected by a passage 93 to the reference pressure $P_o$. The chamber 85 is connected through a fixed orifice 94, a passage 95, and a line 96 with a source of pressure fluid at the regulated pressure $P_r$.

The just described construction provides fluid conducting means including the fixed orifice 94 and the variable orifice 91 connected in series between the supply pressure $P_r$ and the reference pressure $P_o$ so that the pressure $P_{s3}$ is developed in the chamber 85 therebetween in accordance with the ratio of the effective areas of the fixed and variable orifices.

When the chambers 74 and 77 are subjected to signal pressures $P_{s1}$ and $P_{s2}$, the diaphragms 73 and 76 will urge the valve member 90 to the right, tending to decrease the area of variable orifice 91 and increase the pressure $P_{s3}$ in chamber 78 until the pressure $P_{s3}$ acting to the left on the diaphragm 76 balances the combined effects of pressures $P_{s1}$ and $P_{s2}$ on diaphragms 73 and 76. Thereafter, the adder 14 will continually seek an equilibrium condition in which pressure $P_{s3}$ equals the sum of pressures $P_{s1}$ and $P_{s2}$.

The pressure $P_{s3}$ is transmitted from chamber 85 via a passage 97 and line 98 to the comparer 18 which compares the signal $P_{s3}$ with a roll rate command signal supplied to the comparer 18 by suitable command or programming means 16 to provide an error signal which may be amplified in any well known manner to a strength sufficient to operate the actuator 22 for the roll rate correction means 24 and 25.

Because the acceleration responsive roll rate sensors 12 and 12' are sensitive only to radial acceleration, the above described tachometer means, which includes the sensors 12 and 12' and the adder 14, is incapable of distinguishing between different directions of roll. Accordingly, the roll rate control system of this invention includes means for sensing the direction of roll rate correction, this means including the acceleration responsive sensors 26 and 26', the constructions of which are similar to that of sensors 12 and 12'. Thus, the sensor 26 comprises a mass 105 which is supported between bellows 106 and 107, with the bellows 106 having an effective area, in this example, which is twice that of bellows 107. Sensors 12 and 12' are preferably located equal distances from the axis of rotation, and likewise sensors 26 and 26' are themselves equally spaced about axis 11. This preference is because to space one member of a pair a different amount from axis 11 than the other member is to require that some compensation be built into the arrangement.

The mass 105 is confined to movements along a path normal to a radius therethrough and to the rotational axis 11 of the missile 10, and so is insensitive to the angular velocity of the missile but is responsive to changes in that angular velocity. The sensor 26 is supplied with pressure fluid at supply pressure $P_r$ by a line 110 and is connected by line 111 to the drain or reference pressure $P_0$.

When the missile 10 is at zero or a constant rotational velocity, and is free of other acceleration effects having components acting in a direction of movement of mass 105, the sensor 26 provides a corresponding fluid pressure signal $P_{s4}$ in a line 112, the pressure signal $P_{s4}$ being one-half the supply pressure $P_r$. If the missile 10 is accelerated in rotation, the pressure signal $P_{s4}$ will increase or decrease in accordance with the direction of acceleration, while the degree of pressure signal change will correspond with the magnitude of the acceleration. It will be understood that the sensors 26 and 26' are responsive to both the magnitude and direction of acceleration and insensitive to the magnitude of steady state velocity. The pressure signal $P_{s4}$ may be either fed directly to indicating means calibrated in terms of rate of roll correction, or the pressure signal $P_{s4}$ may be utilized to confirm or reverse the direction in which roll rate correction is applied by correcting means such as jets 24 and 25, all in a manner which will be made apparent as the description proceeds.

If the missile 10 undergoes acceleration from yaw, pitch, course change, or the like, having a component such as ($a'$) acting in a direction of movability of the mass 105 of the sensor 26, there will be introduced in the signal $P_{s4}$ a corresponding error. It is for this reason that the invention includes the diametrically disposed acceleration responsive means or direction sensor 26' having a mass 105' and bellows 106', 107' corresponding to those of the direction sensor 26. The sensor 26' provides a fluid pressure signal $P_{s5}$ which, when the missile 10 is free of other accelerations such as ($a'$), corresponds to the rate and direction of change of the missile roll. The direction sensors 26 and 26' are oriented so that acceleration components such as ($a'$) produce equal but opposite changes in the signal pressures $P_{s4}$ and $P_{s5}$.

The signal pressures $P_{s4}$ and $P_{s5}$ are transmitted by lines 112 and 114 to the adder 27, the construction of which is similar to the previously described adder 14. The adder 27 combines the pressures $P_{s4}$ and $P_{s5}$ to produce a resulting signal pressure $P_{s6}$ which is applied by a transmission line 115 to the comparer 18. The comparer 18 compares the signal $P_{s6}$ to the direction command signal applied by programmer 16. If the signal $P_{s6}$ resulting from roll rate correction is confirmed by the comparer 18 the correction being effected by jets 24 and 25 is in the proper direction, and if the signal $P_{s6}$ is contrary to the direction command, a reversing signal is sent via transmission line 28 to the actuator 22 to reverse the actuation of jets 24 and 25.

From the foregoing detailed description of a roll control system and fluid pressure operated tachometer embodying the invention, it will be appreciated that there has been provided thereby means for producing fluid pressure signals corresponding to the roll rate or rotational velocity of missiles and the like, and for utilizing such signals to correct deviations of the roll rate from a predetermined rate or program of rates. It will also be appreciated that the invention provides a missile control system which is not only responsive to changes in the roll rate but also responsive to the direction of roll rate correction.

It will be understood that the foregoing described constructions are exemplary only and that many modifications and substitutions may be resorted to to suit the conditions of application without departing from the spirit of the invention. For example, the acceleration responsive means or sensors 12, 12', 26, and 26' may utilize adjustable spring loading means in place of the bellows 36, 36', 107, and 107'. Also, movable control surfaces could be substituted for the tangential jets 24, 25, and other forms of pressure signal adding means that the adders 14 and 27 may be employed. Accordingly, although the invention has been described in considerable detail with reference to a specific control system and tachometer embodying the invention, it will be understood that the invention is not limited thereto, but rather the invention includes all those changes, modifications, adaptations, substitutions, and uses as are reasonably embraced by the scope of the claims hereof.

Having thus described our invention, we claim:

1. Apparatus for producing a fluid pressure signal corresponding to angular velocity about an axis and with respect to an inertia frame of reference, said apparatus comprising:
    (a) first and second linear acceleration responsive means offset from said axis in opposite directions therefrom along first and second radii,
    (b) said first acceleration responsive means being adapted for connection to a source of pressure fluid and capable of providing a first fluid pressure signal corresponding to acceleration forces along the first radius,
    (c) said second acceleration responsive means being adapted for connection to a source of pressure fluid and capable of providing a second fluid pressure signal corresponding to acceleration forces along the second radius, and
    (d) dual chamber adder means for adding said first and second fluid pressure signals to effectively nullify the effects of axial or translational acceleration forces, thus to provide a signal accurately corresponding to angular velocity of said apparatus about said axis, despite perturbations with respect to the frame of reference.

2. A roll rate control system for missiles and the like for controlling the angular velocity thereof about an axis and with respect to an inertia frame of reference, said system comprising:
    (a) first and second linear acceleration responsive means offset from said axis in opposite directions therefrom along first and second radii,
    (b) said first acceleration responsive means being connected to a source of pressure fluid and capable of providing a first fluid pressure signal corresponding to acceleration forces along the first radius, (c) said second acceleration responsive means being connected to a source of pressure fluid and capable of providing a second fluid pressure signal corresponding to acceleration forces along the second radius, (d) multiple chamber means for adding said first and second fluid pressure signals to effectively nullify the effects of axial or translational acceleration forces, thus to provide a third fluid pressure signal accurately corresponding to angular velocity of said apparatus about said axis, despite perturbations with respect to the frame of reference, (e) means for comparing said third fluid pressure signal with a command signal to provide a roll rate error signal, and (f) roll rate correcting means responsive to said roll rate error signal to change said roll rate in a direction tending to reduce said error.

3. Fluid pressure apparatus for producing a signal pressure corresponding to acceleration forces resulting from rotation of a body about an axis and independent of lateral accelerating movements of said body with respect to an inertial frame of reference, said apparatus comprising:

(a) first and second linear acceleration responsive means offset from said axis in opposite directions along radii therefrom and each comprising an inertial member mounted for displacement in opposite directions in response to accelerating force components, (b) said first acceleration responsive means providing a first signal pressure which increases in accordance with displacement of its inertial member in one direction and which decreases in accordance with displacement in the reverse direction, (c) said second acceleration responsive means providing a second signal pressure which decreases in accordance with displacement of its inertial member in said one direction and which increases in accordance with displacement in said reverse direction, and (d) dual chamber adder means responsive to said first and second signal pressures to provide a third signal pressure corresponding to the sum of said first and second signal pressures, whereby changes in said first and second signal pressures resulting from lateral accelerating movements of said body are cancelled and said third signal pressure is representative of accelerating forces resulting only from rotation of said body about said axis.

4. Fluid pressure apparatus as defined in claim 3 and wherein said inertial members are supported for movement along said radii, whereby said third pressure signal is representative of angular velocity of said body about said axis.

5. Fluid pressure apparatus as defined in claim 3 and wherein said inertial members are each supported for movement normal to said radii and in a plane normal to said axis, whereby said third signal pressure is representative of changes in angular velocity of said body about said axis.

6. Fluid pressure apparatus as defined in claim 3 and wherein said acceleration responsive means each comprise pressure fluid conducting means for connection to a source of pressure fluid and including first and second orifices connected in series so that fluid flow through said orifices will establish therebetween a resulting signal pressure related to the ratio of said orifices, biasing means urging the inertial member in one direction with relatively constant predetermined force, a pressure to force means responsive to said resulting signal pressure and acting against said inertial member in a direction opposite to said biasing means, means cooperating with said inertial member to vary the effective area of at least one of said orifices upon displacement of said member by accelerating forces whereby displacement of said member in either direction will produce a change in said resulting signal pressure until the net force of said biasing means and said pressure to force means balances the displacing force, whereby said resulting signal pressure is representative of said displacing force.

7. Fluid pressure apparatus for producing signal pressures corresponding to angular velocity of a body about an axis and to changes in said angular velocity and independent of lateral accelerating movements of said body, said apparatus comprising:

(a) first pair of linear acceleration responsive means offset from said axis in opposite directions along radii therefrom, each acceleration responsive means comprising an inertial member mounted for displacement in opposite directions in response to accelerating force components along their respective radii, (b) a second pair of linear acceleration responsive means offset from said axis in opposite directions along radii therefrom, each of said second pair of acceleration responsive means comprising an inertial member mounted for displacement in opposite directions in response to accelerating force components acting normal to their respective radii and in a plane normal to said axis, (c) said first pair of acceleration responsive means providing a signal pressure which increases in accordance with increased displacement of the inertial member along the radius in one direction and which decreases with decreased displacement of the inertial member along the radius, (d) said second pair of acceleration responsive means providing a signal pressure which increases in accordance with the increase of rotational speed in one direction and which decreases in accordance with decrease of rotational speed and with any increase of speed in the other direction, (e) first adder means responsive to the sum of the pressure signals of said first pair of acceleration responsive means to provide a pressure signal corresponding to angular velocity of said body about said axis and independent of lateral accelerations thereof, and (f) a second adder means responsive to the sum of the pressure signals of said second pair of acceleration responsive means to provide a pressure signal corresponding to changes in angular velocity of said body about said axis and independent of lateral accelerations thereof.

8. A roll rate and direction control system comprising in combination: fluid pressure apparatus as defined in claim 7, means for comparing the signal pressure outputs of said first and second adders with roll rate and direction command signals to provide roll rate and direction correction error signals, and accelerating means responsive to said error signals for correcting said roll rate in a direction to reduce said error signals, whereby said roll rate and direction is controlled by said command signals.

9. Fluid pressure apparatus as defined in claim 8 and wherein said acceleration responsive means each comprise pressure fluid conducting means for connection to a source of pressure fluid and including first and second orifices connected in series so that fluid flow through said orifices will establish therebetween a resulting signal pressure related to the ratio of said orifices, biasing means urging the inertial member in one direction with relatively constant predetermined force, a pressure to force means responsive to said resulting signal pressure and acting against said inertial member in a direction opposite to said biasing means, means cooperating with said inertial member to vary the effective area of at least one of said orifices upon displacement of said member by accelerating forces whereby displacement of said member is either direction will produce a change in said resulting signal pressure until the net force of said biasing means and said pressure to force means balances the displacing force, whereby said resulting signal pressure is representative of said displacing force.

10. Apparatus for producing a fluid pressure signal corresponding to angular velocity about an axis and with respect to an inertial frame of reference, said apparatus comprising:
(a) first and second linear acceleration responsive means offset from said axis in opposite directions along first and second radii therefrom and capable of providing first and second signal pressures, respectively, corresponding to accelerating forces acting along their respective radii,
(b) said acceleration responsive means each comprising support means, an inertial member mounted for displacement in opposite directions along said respective radius in response to acceleration forces therealong, pressure fluid conducting means for connection to a source of pressure fluid and including first and second orifices connected in series so that fluid flow through said orifices will establish therebetween a resulting signal pressure related to the ratio of areas of said orifices, biasing means urging said inertial member in one direction along its respective radius with relatively constant predetermined force, a pressure to force means responsive to said resulting signal pressure and acting against said member in the opposite direction, means cooperating with said inertial member for varying the effective area of one of said orifices upon displacement of said member by acceleration forces acting along said radius whereby displacement of said member in said one direction will increase said signal pressure until said pressure to force means balances the displacing forces, and displacement of said member in the opposite direction will decrease said signal pressure until said pressure to force means balances the displacing forces, and
(c) adder means responsive to said first and second signal pressures to provide a third signal pressure corresponding to the acceleration force on said inertial members resulting from angular velocity thereof about said axis.

11. Apparatus as defined in claim 10, and wherein said biasing means comprises pressure responsive force producing means responsive to regulated fluid pressure from said source.

12. A roll rate control system for missiles and the like for controlling the angular velocity thereof about an axis and with respect to an inertia frame of reference, said system comprising:
(a) first and second linear acceleration responsive means offset from said axis in opposite directions therefrom along first and second radii,
(b) said first acceleration responsive means being connected to a source of pressure fluid and capable of providing a first fluid pressure signal corresponding to acceleration forces along the first radius,
(c) said second acceleration responsive means being connected to a source of pressure fluid and capable of providing a second fluid pressure signal corresponding to acceleration forces along the second radius,
(d) first adder means for adding said first and second fluid pressure signals to provide a third fluid pressure signal corresponding to angular velocity of said apparatus about said axis,
(e) signal comparing means for comparing said third fluid pressure signal with a command signal to provide a roll rate error signal,
(f) third and fourth acceleration responsive means offset from said axis in opposite directions,
(g) said third acceleration responsive means being connected to a source of pressure fluid and capable of providing a third fluid pressure signal corresponding to magnitude and direction of acceleration forces acting thereon normal to a radius through said third acceleration responsive means and parallel to said axis,
(h) said fourth acceleration responsive means being connected to a source of pressure fluid and capable of providing a fourth fluid pressure signal corresponding to magnitude and direction of acceleration forces acting thereon normal to a radius through said fourth acceleration responsive means and parallel to said axis,
(i) second adder means for combining said third and fourth fluid pressure signals to provide a direction of roll correction signal,
(j) said signal comparing means being operative to compare said direction of roll correction signal with said command signal to provide a direction error signal, and
(k) roll rate changing means responsive to said roll rate error signal and said direction of roll correction signal, to change said roll rate in a direction to bring the roll into conformity with said command signal.

13. A roll rate control system as defined in claim 12 and wherein said first and second acceleration responsive means each comprise pressure fluid conducting means for connection to a source of pressure fluid and including first and second orifices connected in series so that fluid flow through said orifices will establish therebetween a resulting signal pressure related to the ratio of said orifices, biasing means urging the inertial member in one direction with relatively constant predetermined force, a pressure to force means responsive to said resulting signal pressure and acting against said inertial member in a direction opposite to said biasing means, means cooperating with said inertial member to vary the effective area of at least one of said orifices upon displacement of said member by accelerating forces whereby displacement of said member in either direction will produce a change in said resulting signal pressure until the net force of said biasing means and said pressure to force means balances the displacing force, whereby said resulting signal pressure is representative of said displacing force.

References Cited by the Examiner

UNITED STATES PATENTS

| 3,023,625 | 3/1962 | Clement et al. | 73—523 X |
| 3,097,818 | 7/1963 | Heller | 244—78 |
| 3,121,440 | 2/1964 | Heller | 244—1 |

BENJAMIN A. BORCHELT, *Primary Examiner.*

V. R. PENDEGRASS, *Assistant Examiner.*